(12) United States Patent
Cui et al.

(10) Patent No.: US 10,523,919 B2
(45) Date of Patent: *Dec. 31, 2019

(54) APPARATUS AND METHOD FOR ADJUSTING STEREOSCOPIC IMAGE PARALLAX AND STEREO CAMERA

(71) Applicant: SUPERD TECHNOLOGY CO., LTD., Shenzhen (CN)

(72) Inventors: Chunhui Cui, Shenzhen (CN); Lei Song, Shenzhen (CN); Ning Liu, Shenzhen (CN)

(73) Assignee: SUPERD TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,182

(22) Filed: Jan. 25, 2018

(65) Prior Publication Data

US 2018/0167605 A1 Jun. 14, 2018

Related U.S. Application Data

(63) Continuation of application No. 14/726,607, filed on Jun. 1, 2015, now Pat. No. 9,912,936.

(30) Foreign Application Priority Data

Jun. 6, 2014 (CN) .......................... 2014 1 0250764

(51) Int. Cl.
*H04N 13/246* (2018.01)
*H04N 13/128* (2018.01)
(Continued)

(52) U.S. Cl.
CPC ......... *H04N 13/271* (2018.05); *G06T 7/0075* (2013.01); *G06T 7/593* (2017.01); *H04N 13/246* (2018.05); *H04N 13/128* (2018.05)

(58) Field of Classification Search
CPC .......... H04N 13/0022; H04N 13/0239; H04N 13/0296; H04N 2013/0081;
(Continued)

(56) References Cited

U.S. PATENT DOCUMENTS

2010/0091093 A1* 4/2010 Robinson ............... G09G 3/003
348/47
2013/0113891 A1* 5/2013 Mayhew .............. H04N 13/239
348/47

* cited by examiner

*Primary Examiner* — Dave Czekaj
*Assistant Examiner* — Samuel D Fereja
(74) *Attorney, Agent, or Firm* — Anova Law Group, PLLC

(57) ABSTRACT

The present invention provides a method and apparatus for adjusting stereoscopic image parallax and a stereo camera. The parallax adjusting method includes obtaining a depth range of a current scene. A preset parallax range may also be obtained according to a current viewing condition. Expected camera parameters of the current scene are calculated according to the depth range of the current scene and the preset parallax range. The stereo camera is adjusted according to the expected camera parameters and used to capture preprocessed stereoscopic images. Further, the captured preprocessed stereoscopic images are processed according to the expected camera parameters to make the preprocessed stereoscopic images suitable for being viewed under the current viewing condition. The disclosed method and apparatus can jointly adjust parameters of the stereo camera and captured stereo images to obtain images or videos with a maximum parallax as well as desired display effect under a specified condition.

18 Claims, 5 Drawing Sheets

(51) Int. Cl.
*H04N 13/271* (2018.01)
*G06T 7/00* (2017.01)
*G06T 7/593* (2017.01)

(58) Field of Classification Search
CPC ........... H04N 13/0018; H04N 13/0246; H04N 13/0278; H04N 13/0055; H04N 13/0011; H04N 13/0275; H04N 13/0059; H04N 13/0051; H04N 13/0497; H04N 13/0203; H04N 13/0422; H04N 13/0438; H04N 13/0257; H04N 13/0289; H04N 13/0404; H04N 13/0434; H04N 13/0025; H04N 13/0048; H04N 13/0409; H04N 13/0425; H04N 13/0452; H04N 13/0456; H04N 13/0475; H04N 2013/0096; H04N 13/0007; H04N 13/0029; H04N 13/0221; H04N 13/0242; H04N 19/597; H04N 2013/0085; H04N 13/0066; H04N 13/026; H04N 13/0271; H04N 13/04; H04N 2013/0088; H04N 21/4882; H04N 13/0014; H04N 13/0033; H04N 13/0232; H04N 13/025; H04N 13/0429; H04N 13/044; H04N 13/0443; H04N 2013/0077; H04N 2013/0092; H04N 21/4312; H04N 2213/002; H04N 9/097; H04N 13/0037; H04N 13/02
See application file for complete search history.

APPARATUS AND METHOD FOR ADJUSTING STEREOSCOPIC IMAGE PARALLAX AND STEREO CAMERA

CROSS-REFERENCES TO RELATED APPLICATIONS

This application is a continuation application of U.S. patent application Ser. No. 14/726,607 filed on Jun. 1, 2015, which claims the priority of Chinese Patent Application No. 201410250764.6, entitled "Apparatus and Method for Adjusting Stereoscopic Image Parallax and Stereo camera", filed on Jun. 6, 2014, the entire contents of which is incorporated herein by reference.

FIELD OF THE DISCLOSURE

The present disclosure generally relates to the field of image processing technologies and, more particularly, relates to an apparatus and a method for adjusting stereoscopic image parallax and a stereo camera.

BACKGROUND

Nowadays, existing photograph technologies for capturing three-dimensional (3D) pictures require high photographic skill level. Only professional photographers may be capable of shooting 3D pictures. Further, the captured pictures require a lot of post-production editing and processing. Ordinary consumers may find it very difficult to capture 3D pictures or 3D videos that are ready to view directly. In addition, stunning 3D effects usually require large parallax between the stereoscopic images. However, when watching 3D images or 3D videos with large parallax, the viewers may experience dizziness, eye fatigue and other symptoms.

Some technologies correlate parameters in a shooting scene and parameters of camera(s) to conveniently achieve a desirable stereoscopic effect of the shooting scene recorded by the camera(s). Further, setting different parameters of the shooting scene may bring diversified effects to the stereoscopic images. However, when capturing images using these technologies, users need to configure parallax settings which may require a highly skilled professional photographer or a stereographer. Moreover, the captured images are still likely to cause the viewers to experience dizziness, eye fatigue and other symptoms. In addition, these technologies may require complicated calculation and slow down camera responses, causing heavy load to the processor and high power consumption.

Therefore, according to disclosed embodiments, it is desirable to provide a method and apparatus that not only captures stereoscopic images with large parallax, but also ensures a comfortable viewing experience at the same time. The disclosed method and system are directed to solve one or more problems set forth above and other problems.

BRIEF SUMMARY OF THE DISCLOSURE

One aspect of the present disclosure provides a method for adjusting stereoscopic image parallax. The method may be used in a stereo camera having at least two lenses with parallel optical axes. The parallax adjusting method may include obtaining a depth range of a current scene. A preset parallax range may also be obtained according to a current viewing condition. The depth range of the current scene and the preset parallax range may be used to determine expected camera parameters. The stereo camera may be adjusted according to the expected camera parameters. The adjusted stereo camera may capture preprocessed stereoscopic images according to the expected camera parameters. Further, the captured preprocessed stereoscopic images may be processed according to the expected camera parameters to make the preprocessed stereoscopic images suitable for being viewed under the current viewing condition.

Another aspect of the present invention provides an apparatus for adjusting stereoscopic image parallax in a stereo camera having at least two lenses with parallel optical axes. The parallax adjusting apparatus may include a depth acquisition unit, a parallax acquisition unit, a calculation unit and a processing unit. The depth acquisition unit may be configured to obtain a depth range of a current scene. The parallax acquisition unit may be configured to obtain a preset parallax range according to a current viewing condition. The calculation unit may be configured to calculate expected camera parameters of the current scene according to the depth range of the current scene and the preset parallax range. Further, the processing unit may be configured to adjust the stereo camera according to the expected camera parameters and, after capturing preprocessed stereoscopic images using the adjusted stereo camera, to process the preprocessed stereoscopic images according to the expected camera parameters to make the preprocessed stereoscopic images suitable for being viewed under the current viewing condition.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a method and an apparatus for adjusting stereoscopic image parallax. The method and apparatus may be used in a stereo camera. The stereo camera may have a plurality of lenses for capturing stereoscopic images. Among the plurality of lenses, one or more pairs of lenses may have parallel optical axes. For example, a stereo camera may have four lenses on a same horizontal plane, which means this stereo camera has six pairs of lenses having parallel optical axes. When a stereo camera take one shot of a current scene, a pair of images corresponding to one pair of lenses may be obtained including a left image and a right image. Further, this method may also be used to adjust parallax in stereoscopic images taken by two individual cameras with parallel optical axes.

For exemplary purposes, the stereo camera described in embodiments of the present disclosure may refer to a stereo camera with two lenses having parallel optical axes. It should be noted that similar method and/or apparatus embodiments may also apply to stereo cameras with more than two lenses and two or more individual cameras with parallel optical axes.

Hereinafter, a pair of stereoscopic images taken by a pair of lenses with parallel optical axes may be referred to as a stereo image pair. Hereinafter, the distance between a left lens and a right lens with parallel optical axes may be referred to as interaxial distance.

Figure 1:
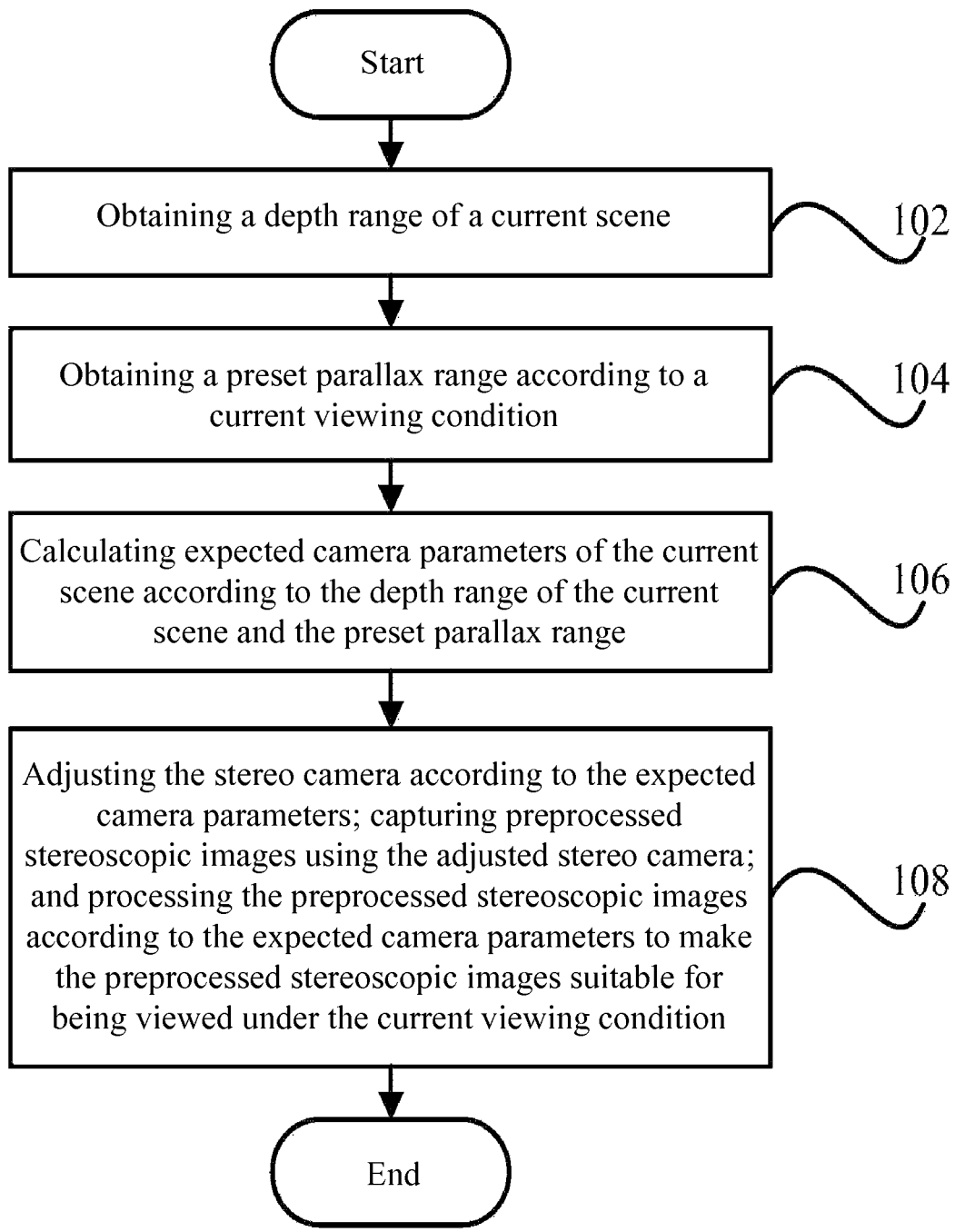
FIG. 1 illustrates a flow chart of an exemplary method for adjusting stereoscopic image parallax consistent with embodiments of the present disclosure.

FIG. 1 illustrates a flow chart of an exemplary method for adjusting stereoscopic image parallax consistent with embodiments of the present disclosure. As shown in FIG. 1, the exemplary method may be used in a stereo camera and include the following steps.

Step 102: obtaining a depth range of a current scene.

Step 104: obtaining a preset parallax range according to a current viewing condition.

Step 106: calculating expected camera parameters of the current scene according to the depth range of the current scene and the preset parallax range.

Step 108: adjusting the stereo camera according to the expected camera parameters and capturing preprocessed stereoscopic images using the adjusted stereo camera. Further, the preprocessed stereoscopic images are processed according to the expected camera parameters to make the preprocessed stereoscopic images suitable for being viewed under the current viewing condition.

Thus, in the above exemplary method for adjusting stereoscopic image parallax, a depth range of a current scene may be obtained, and a preset parallax range may also be obtained according to a current viewing condition. The depth range of the current scene and the preset parallax range may be used to determine expected camera parameters. The stereo camera may adjust an interaxial or interocular distance of the stereo camera to an expected interaxial distance. The term interaxial distance or interocular distance, as described above, may refer to a distance between two lenses of the stereo camera with two lenses or between any two lenses of the stereo camera with more than two lenses.

Further, the adjusted stereo camera may capture preprocessed stereoscopic images according to the expected interaxial distance. Further, the preprocessed stereoscopic images captured using the expected interaxial distance may be processed such that the preprocessed stereoscopic images satisfies the preset parallax range corresponding to the current viewing condition. Thus, the preprocessed stereoscopic images may be suitable for being viewed under the current viewing condition.

In certain embodiments, the expected camera parameters may include an expected distance between an image plane and an optical center of the stereo camera, and an expected interaxial distance, etc. The expected distance between the image plane and the optical center of the stereo camera and the expected interaxial distance may satisfy equation $$d_1 D_1 < f \times B \leq \frac{(d_1 - d_2) \times D_1 \times D_2}{D_2 - D_1},$$

where f denotes the expected distance between the image plane and the optical center of the stereo camera; B denotes the expected interaxial distance, $[D_1, D_2]$ denotes the depth range of the current scene, and $[d_1, d_2]$ denotes the preset parallax range. Further, $d_1$ refers to maximum positive parallax value under the current viewing condition and satisfies $d_1 > 0$; and $d_2$ refers to maximum negative parallax value under the current viewing condition and satisfies $d_2 < 0$.

Further, when designing a stereo camera or adjusting a stereo camera when taking stereoscopic images, proper f and B may be configured according to equation $$d_1 D_1 < f \times B \leq \frac{(d_1 - d_2) \times D_1 \times D_2}{D_2 - D_1}.$$

After such configuration, users may view 3D images or 3D videos captured by the stereo camera with desired display effect.

In one embodiment, the interaxial distance of the stereo camera may be adjustable, and the expected camera parameters may include the expected interaxial distance and the expected depth of the zero-parallax plane. The stereo camera may be adjusted based on the expected camera parameters, and the adjusted stereo camera may be used to capture the preprocessed stereoscopic images. The captured preprocessed stereoscopic images can be further processed based on the expected camera parameters.

More specifically, the interaxial distance of the stereo camera may be adjusted to the expected interaxial distance, and the stereo camera with the adjusted interaxial distance may be used to capture the preprocessed stereoscopic images. The expected interaxial distance may be denoted as $$B = \frac{d_1 - d_2}{f\left(\frac{1}{D_1} - \frac{1}{D_2}\right)}.$$

Further, the captured preprocessed stereoscopic images may be processed such that the depth of the zero-parallax plane equals to the expected depth of the zero-parallax plane. The expected depth of zero-parallax plane may be denoted as $$D_0 = \frac{D_1 D_2 (d_1 - d_2)}{D_1 d_1 - D_2 d_2},$$

where f denotes the distance between the image plane and the optical center of the stereo camera, $[D_1, D_2]$ denotes the depth range of the current scene, and $[d_1, d_2]$ denotes the preset parallax range.

It should be noted that, comparing the definitions of the parameter f in the equation $$d_1 D_1 < f \times B \leq \frac{(d_1 - d_2) \times D_1 \times D_2}{D_2 - D_1}$$

and the equation $$B = \frac{d_1 - d_2}{f\left(\frac{1}{D_1} - \frac{1}{D_2}\right)},$$

the definition of parameter f in the former equation is added with the term "expected", which indicates that the parameter f here is an unknown parameter that needed to be obtained, while the parameter f in the latter equation is a known parameter. However, the physical meanings of both parameters f in the two equations are the same. Similarly, in the present disclosure, adding "expected" to the definitions of B and $D_0$ is with the same intention.

When the interaxial distance is adjustable, the expected camera parameters may include the expected interaxial distance and the expected depth of zero-parallax plane. The interaxial distance of the stereo camera may be controlled and automatically adjusted to equal the expected interaxial distance. That is, the parameters of the stereo camera may be configured. When the interaxial distance of the stereo camera equals the expected interaxial distance, the stereo camera may capture the preprocessed stereoscopic images. Because the optical axes of a left lens and a right lens in the stereo camera are parallel, the captured preprocessed stereoscopic images may not have zero-parallax plane. That is, there is no image disparity between a preprocessed stereo image pair. Therefore, further processing of the captured preprocessed stereoscopic images is required to produce the zero-parallax plane and ensure the depth of the zero-parallax plane equals the expected depth of the zero-parallax plane. Thus, the parallax range of the captured preprocessed stereoscopic images after such processing may equal the preset parallax range.

In certain embodiments, the captured preprocessed stereoscopic images may be processed such that the depth of the zero-parallax plane equals to the expected depth of the zero-parallax plane. Specifically, a left image of the preprocessed stereoscopic images may be horizontally shifted to the left for a predetermined distance. A right image of the preprocessed stereoscopic images may be horizontally shifted to the right for the predetermined distance. After the horizontal shifting process, the depth of the zero-parallax plane of the preprocessed stereoscopic images may equal the expected depth of zero-parallax plane. The predetermined distance may be denoted as $$h = \frac{D_2 d_2 - D_1 d_1}{2 \times (D_1 - D_2)},$$

where $[D_1, D_2]$ denotes the depth range of the current scene, and $[d_1, d_2]$ denotes the preset parallax range.

In the disclosed parallax adjusting method, since the optical axes of the left lens and the right lens in the stereo camera are parallel, a captured preprocessed stereo image pair does not have zero-parallax plane. The preprocessed stereo image pair may be shifted on a horizontal direction. Specifically, a left image may be horizontally shifted to the left for a predetermined distance, which is equivalent to horizontally shift the image plane of the left lens to the right. Similarly, the right image may be horizontally shifted to the right for a predetermined distance, which is equivalent to horizontally shift the image plane of the right lens to the left. After performing the horizontal shifting process, a line connecting the optical center and the image plane center of the left lens and a line connecting the optical center and the image plane center of the right lens may converge and intersect at one point. A plane crossing the point of intersection and parallel to the image plane is the zero-parallax plane. The vertical distance between the point of intersection and the stereo camera is the depth of the zero-parallax plane. The predetermined distance for moving the lenses may be adjusted such that the depth of the zero-parallax plane equals the expected depth of zero-parallax plane. Therefore, the parallax range of the processed stereo image pair may equal to the preset parallax range.

In one embodiment, the interaxial distance of the stereo camera may be fixed. The expected camera parameters may include an expected depth of zero-parallax plane. The expected depth of zero-parallax plane may satisfy equation $$\frac{D_2 \times f \times B}{f \times B - d_2 \times D_2} \leq D_0 \leq \frac{D_1 \times f \times B}{f \times B - d_1 \times D_1},$$

where $D_0$ denotes the expected depth of zero-parallax plane, f denotes a distance between the image plane and the optical center of the stereo camera, B denotes the interaxial distance, $[D_1, D_2]$ denotes the depth range of the current scene, and $[d_1, d_2]$ denotes the preset parallax range.

When the interaxial distance is fixed, the expected camera parameters may include an expected depth range of zero-parallax plane. After the stereo camera adjusts the expected camera parameters to satisfy equation $$\frac{D_2 \times f \times B}{f \times B - d_2 \times D_2} \leq D_0 \leq \frac{D_1 \times f \times B}{f \times B - d_1 \times D_1},$$

preprocessed stereoscopic images captured by the stereo camera may be further processed to ensure against undesirable display effect.

In one embodiment, the step of obtaining a depth range of a current scene may further include: controlling the stereo camera to capture an initial stereo image pair, and calculating a parallax between the initial stereo image pair. The depth range of the current scene may be obtained according to a calibration result of the stereo camera and the parallax between the initial pair of stereoscopic images.

Further, as the depth range may be obtained by processing the initial stereo image pair, the process of obtaining the depth range may be fully automatic. According to the parallax between a left image and a right image of the initial stereo image pair, combining current parameter f of the stereo camera obtained from calibration, the depth information of the shooting scene may be restored. The current parameter f of the stereo camera obtained from calibration refers to a distance between an optical center and an image plane (i.e. the mirrored image sensor panel) of the two lenses in the stereo camera (refer to equations (5) and (6) for detailed description). It is understood that, in one example, the depth range may refer to a range between a closest point and a farthest point of a current scene. In another example, the depth range may refer to a range between a closest point and a farthest point of a certain subject in a current scene. The subject may be selected according to practical filming needs.

After obtaining the depth range of the current scene, the exemplary method may further include obtaining a preset parallax range according to a current viewing condition, and determining expected camera parameters according to the depth range of the current scene, current parameters of the stereo camera and the preset parallax range. The stereo camera may adjust an interaxial distance to equal an expected interaxial distance, capture preprocessed stereoscopic images with the expected interaxial distance, and process the preprocessed stereoscopic images to satisfy the preset parallax range corresponding to the current viewing condition. Therefore the stereoscopic images may be suitable for being viewed under the current viewing condition.

In another embodiment, the step of obtaining a depth range of a current scene may further include: setting a preset depth range according to a received command, obtaining the preset depth range, and configuring the depth range of the current scene to equal to the preset depth range.

Further, the depth range of the current scene may be pre-stored in the stereo camera. When capturing stereoscopic images, the stereo camera may directly apply the pre-stored depth range. In addition, a user may voluntarily configure a proper depth range according to a current scene.

It is understood that, obtaining the depth range of the current scene may not be limited to the two embodiments described above. For example, a user may assign a particular area in the current scene (as a subject), and by calculating the depth range of the assigned area, the depth range $[D_1, D_2]$ may be obtained semi-automatically.

In certain embodiments, obtaining a preset parallax range according to a current viewing condition may further include: according to parameters of a stereoscopic display device and desired viewing parameters corresponding to the stereoscopic display device, calculating a maximum positive parallax value and a maximum negative parallax value under the current viewing condition.

Viewing conditions may vary according to different stereoscopic display devices with various display screen size and different viewing parameters such as viewing distance. The parallax ranges for desirably viewing 3D images under different viewing conditions may also be different. However, under each specified viewing condition, an optimal parallax range limit may exist, so that the captured 3D images are within such parallax range limit and generally do not cause undesired display effect. That is, the parallax range limit refers to a maximum parallax range of the 3D images when ensuring a desired viewing experience. Details about desired visual effect may refer to the article by T Shibata, J Kim, D M Hoffman, M S Banks, "The zone of comfort: Predicting visual discomfort with stereo displays", Journal of vision, 11 (8): 11, 1-29, 2011.

When using the parallax range limit to determine expected camera parameters of the stereo camera, the preprocessed stereoscopic images after processing according to the expected camera parameters may not only be desired for viewing, but also have maximized parallax range. Comparing to the existing technologies which sets object distance and parallax of key points, using the parallax range limit as the preset parallax range may guarantee a desired viewing experience of the stereoscopic images.

The preset parallax range may be affected by viewing conditions. Therefore, when pre-storing a plurality of preset parallax ranges, a plurality of viewing modes corresponding to the plurality of preset parallax ranges may also be pre-stored. The viewing modes may include a theater mode, a TV mode, a computer mode, a mobile phone mode, a tablet mode, etc. When using the stereo camera to capture stereoscopic images, a user may choose a desired viewing mode so that the preset parallax range may adjust automatically to maximize the parallax range of captured stereoscopic images under desirable viewing condition.

In certain embodiments, the stereo camera may be adjusted based on the expected camera parameters, and the adjusted stereo camera may be used to capture the preprocessed stereoscopic images. The captured preprocessed stereoscopic images can be further processed based on the expected camera parameters to be suitable for being viewed under the current viewing condition. More specifically, according to the expected camera parameters, at least one of a distance between the optical center and the image plane and an interaxial distance of the stereo camera may be adjusted. After such adjustment, the stereo camera may capture preprocessed stereoscopic images. According to the expected camera parameters, the preprocessed stereoscopic images may be processed by horizontally shifting a left image and a right image of the preprocessed stereoscopic images in opposite directions.

As the optical axes of the left lens and the right lens in the stereo camera are parallel, the captured preprocessed stereoscopic images do not have zero-parallax plane. Therefore, after processing the preprocessed stereoscopic images by horizontal shifting, the depth of the zero-parallax plane of the preprocessed stereoscopic images may equal the expected depth of zero-parallax plane, and the parallax range of the preprocessed stereoscopic images may equal the preset parallax range.

In certain embodiments, the disclosed parallax adjusting method may further include step 110 (not shown in FIG. 1): displaying captured preprocessed stereoscopic images and/or captured initial stereoscopic images in real-time on a stereoscopic display, where the stereoscopic display satisfies a preset horizontal resolution requirement. The stereoscopic display may be provided in the stereo camera. The preset horizontal resolution requirement is $$R' \geq \max\left(\frac{d_{1(p)}}{d'_{1(m)}}, \frac{d_{2(p)}}{d'_{2(m)}}\right) \times W',$$

where R' denotes the preset horizontal resolution, $[d_{1(p)}, d_{2(p)}]$ denotes the preset parallax range in pixels, p denotes pixel, $[d'_{1(m)}, d'_{2(m)}]$ denotes the parallax range of the stereoscopic display in meters, m denotes meters, W' denotes the width of the stereoscopic display, max denotes a function to obtain a maximum value.

While capturing images, the stereo camera may display in real-time the captured initial stereo image pair and/or the preprocessed stereoscopic images. However, since the parallax range of the captured images equals the preset parallax range of a specified viewing condition, a stereoscopic display in the specified viewing condition may have different size than the stereoscopic display of the stereo camera. Users may experience dizziness, eye fatigue and other symptoms when viewing the captured images on the stereoscopic display of the stereo camera. Therefore, in order to provide a desired viewing experience, the resolution of the stereoscopic display of the stereo camera should satisfy the preset horizontal resolution requirement to prevent the photographers from undesired viewing experience during filming process.

Figure 2A:
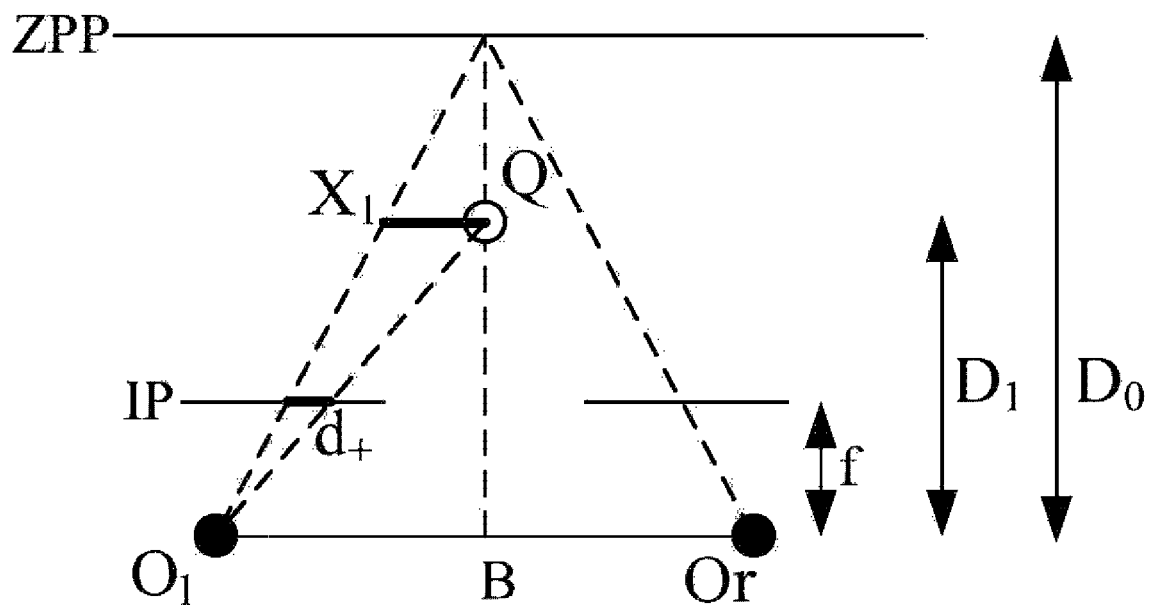
FIG. 2A and FIG. 2B illustrate calculation principles of expected camera parameters consistent with embodiments of the present disclosure.
Figure 2B:
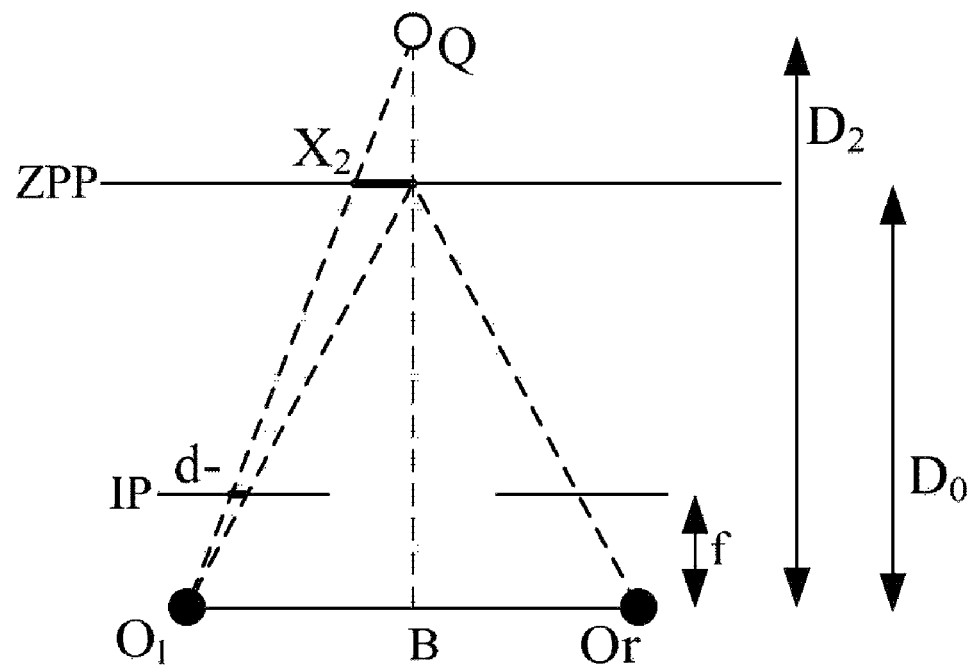

FIGS. 2A and 2B illustrate calculation principles of expected camera parameters consistent with embodiments of the present disclosure.

As shown in FIG. 2A, in a camera coordinate system, $O_l$ and $O_r$ respectively refer to the optical centers of a left lens and a right lens. Two short line segments on the left side and the right side represent the image planes (the mirrored image sensor panel, IP) of the left lens and the right lens. ZPP refers to zero-parallax plane or the plane of convergence. When the optical axes of the left lens and the right lens are parallel, the zero-parallax plane does not exist. To create a zero-parallax plane for captured stereoscopic images, the two image planes may be horizontally shifted towards the middle. The connecting lines between the optical centers and the centers of the image planes (two lines including a left one and a right one, shown as dashed lines in FIG. 2A) may intersect at one point. A plane parallel with the image planes and crossing the intersection point is the zero-parallax plane produced by the horizontal shifting process.

Assuming that ZPP is at depth $D_0$ and an object point Q is at depth $D_1$ ($0<D_1<D_0$), the object point projects an image point on the left image plane. The distance between the image point and the center of the left image plane is d+(d+>0) (shown as a bold line in FIG. 2A). Let parallax $d_1$ of the object point Q between the left image and the right image equals a coordinate of projected point on the left IP minus a coordinate of projected point on the right IP, then $d_1=2d+>0$. According to geometric relationships illustrated in FIG. 2A, equation (1) can be deducted to calculate $d_1$, where f is the distance between the optical center and the image plane (f is the same for the left lens and the right lens), B is the interaxial distance between $O_l$ and $O_r$ (or baseline length). Further, it can be deducted that different object points at the same depth plane have the same parallax.

$$\left.\begin{array}{l}\frac{d_+}{x_1}=\frac{f}{D_1}\\\frac{x_1}{B/2}=\frac{D_0-D_1}{D_0}\end{array}\right\} \Rightarrow d_+=\frac{1}{2}fB\frac{D_0-D_1}{D_0D_1} \quad (1)$$

$$\Rightarrow d_1=2d_+=fB\frac{D_0-D_1}{D_0D_1}(d_1>0)$$

As shown in FIG. 2B, when the object point Q is behind the zero-parallax plane ($D_2>D_0$), equation (2) may be deducted to calculate $d_2$, where the definition of d-(d->0) is the same as d+ which is the distance between the projected image point on the left image plane and the center of the left image plane. According to the definition of parallax, parallax of Q is $d_2=-2d-<0$.

$$\left.\begin{array}{l}\frac{d_-}{x_2}=\frac{f}{D_0}\\\frac{x_2}{B/2}=\frac{D_2-D_0}{D_2}\end{array}\right\} \Rightarrow d_-=\frac{1}{2}fB\frac{D_2-D_0}{D_0D_2} \quad (2)$$

$$\Rightarrow d_2=-2d_-=fB\frac{D_0-D_2}{D_0D_2}(d_2<0)$$

Combining equations (1) and (2) (two scenarios illustrated in FIGS. 2A and 2B), we have $$d=fB\frac{D_0-D}{D_0D}=fB\left(\frac{1}{D}-\frac{1}{D_0}\right) \quad (3)$$

where D is the depth of any object point, d is the corresponding parallax of the object point in the stereo image pair. The units of B, $D_0$ and D are meters. When the unit of f is pixel, then the unit of d is also pixel.

It can be deducted from equation (3) that when depth range is [$D_1$, $D_2$], the corresponding parallax range is $$\Delta d=fB\left(\frac{1}{D_1}-\frac{1}{D_0}\right)-fB\left(\frac{1}{D_2}-\frac{1}{D_0}\right)=fB\left(\frac{1}{D_1}-\frac{1}{D_2}\right) \quad (4)$$

Equation (4) demonstrates that the parallax range $\Delta d$ is irrelevant to the choice of the depth $D_0$ of zero-parallax plane.

Under a specified viewing condition (e.g. the size of stereoscopic display and corresponding desired viewing distance are specified), a set of parallax range limit [$d_1$, $d_2$] exists, where $d_1>0$ denotes an allowed maximum positive parallax, $d_2<0$ denotes an allowed maximum negative parallax. When such parallax range generally does not introduce undesired viewing experience, and depth range [$D_1$,$D_2$] of the shooting scene and parameter f of the stereo camera are known, the interaxial distance B and depth of ZPP $D_0$ may be adjusted to make the positive parallax equal to $d_1$ and to make the negative parallax equal to $d_2$ in the captured preprocessed stereoscopic images. Therefore, the parallax range of the preprocessed stereoscopic images may be maximized under the premise that no undesired viewing experience is introduced.

Based on this notion, equations (1) and (2) may be solved simultaneously as a binary quadratic equation group, and a unique set of solution can be calculated.

$$D_0=\frac{D_1D_2(d_1-d_2)}{D_1d_1-D_2d_2} \quad (5)$$

$$B=\frac{D_1D_2(d_1-d_2)}{f(D_2-D_1)}=\frac{d_1-d_2}{f\left(\frac{1}{D_1}-\frac{1}{D_2}\right)} \quad (6)$$

Parameter f may be calculated and obtained by camera calibration. The camera parameter f may be obtained according to a parameter K in the field of computer vision. Detailed procedure may refer to the article by Z. Zhang, "A flexible new technique for camera calibration", *IEEE Transactions on Pattern Analysis and Machine Intelligence*, 22(11):1330-1334, 2000. [$d_1$, $d_2$] denotes a maximum parallax range according to the specified viewing condition, [$D_1$, $D_2$] denotes the depth range of the scene and may be calculated and obtained by processing the initial stereo image pair.

Further, according to equation (4), when B satisfies equation (6), it can be deducted that $$\Delta d=fB\left(\frac{1}{D_1}-\frac{1}{D_2}\right)=d_1-d_2 \quad (7)$$

That is, when B satisfies equation (6), the adjusted parallax range Δd equals to the allowed maximum parallax range $d_1-d_2$ under the specified viewing condition. When B satisfies equation (8), the parallax range Δd corresponding to the current depth range $[D_1, D_2]$ does not exceed the allowed maximum parallax range $d_1-d_2$ under the specified viewing condition. Therefore, equation (8) is a necessary condition for bringing a desired viewing experience.

$$\Delta d \leq d_1 - d_2 \Rightarrow B \leq \frac{d_1 - d_2}{f\left(\frac{1}{D_1} - \frac{1}{D_2}\right)} \quad (8)$$

In addition, when B satisfies equation (8), $D_0$ may be further configured to divide the parallax range Δd into two parts including a positive parallax and a negative parallax. Equation (9) may describe such relation $$r_D = \frac{D_2 - D_0}{D_0 - D_1} = -\frac{d_2 D_2}{d_1 D_1} = r_d \frac{D_2}{D_1} \quad (9)$$

where $r_D$ denotes the separation of depth range $[D_1, D_2]$ by $D_0$, and $r_d$ is the ratio of positive parallax and negative parallax.

This analysis also indicates that B and $D_0$ are a set of optimal and unique solution which makes the final positive parallax equal $d_1$ and the final negative parallax equal $d_2$.

Figure 3:
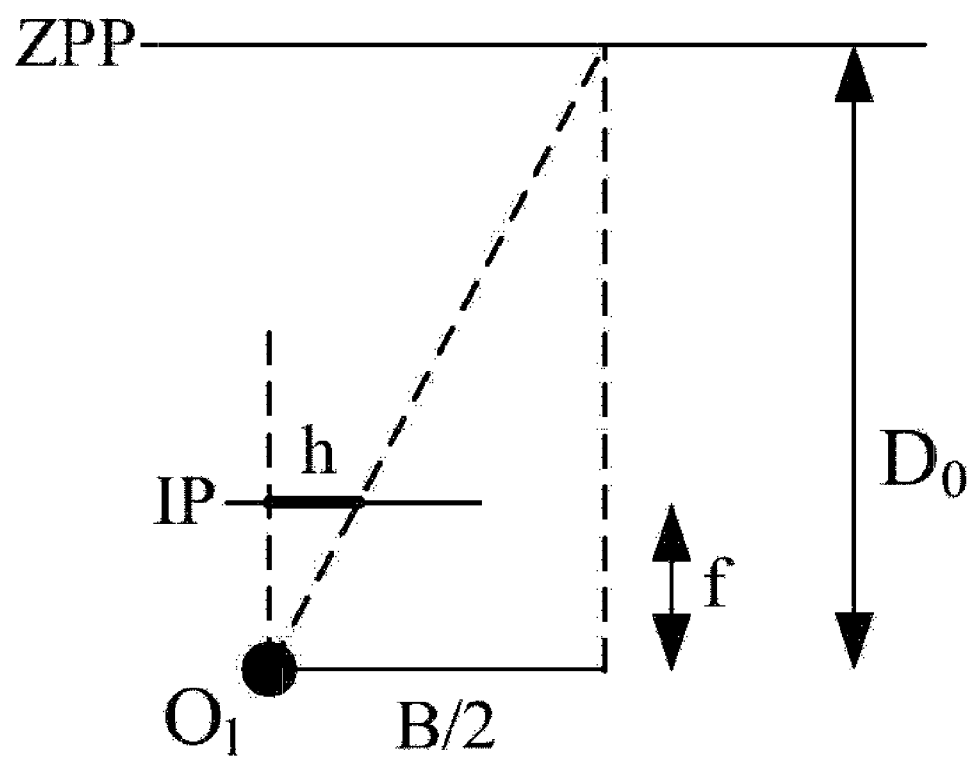
FIG. 3 illustrates calculation principles of predetermined horizontal shifting distance between a left image and a right image consistent with embodiments of the present disclosure.

FIG. 3 illustrates calculation principles of predetermined horizontal shifting distance between a left image and a right image consistent with embodiments of the present disclosure.

As shown in FIG. 3, using horizontal shifting process of the left image as an example, moving the image plane of the left image to the right for a distance of h is equivalent to horizontally shift the left image to the left for a distance of h. After horizontal shifting, a left image of the preprocessed stereoscopic images may be produced when a proper interception is conducted. According to the geometric relationship shown in FIG. 3, equation (10) below may be used for calculating the horizontal shifting distance denoted as h. Similarly, horizontally shifting the right image to the right for a distance of h may produce a right image of the preprocessed stereoscopic images.

$$\frac{h}{B/2 - h} = \frac{f}{D_0 - f} \Rightarrow h = \frac{fB}{2D_0} = \frac{D_2 d_2 - D_1 d_1}{2(D_1 - D_2)} \quad (10)$$

Figure 4:
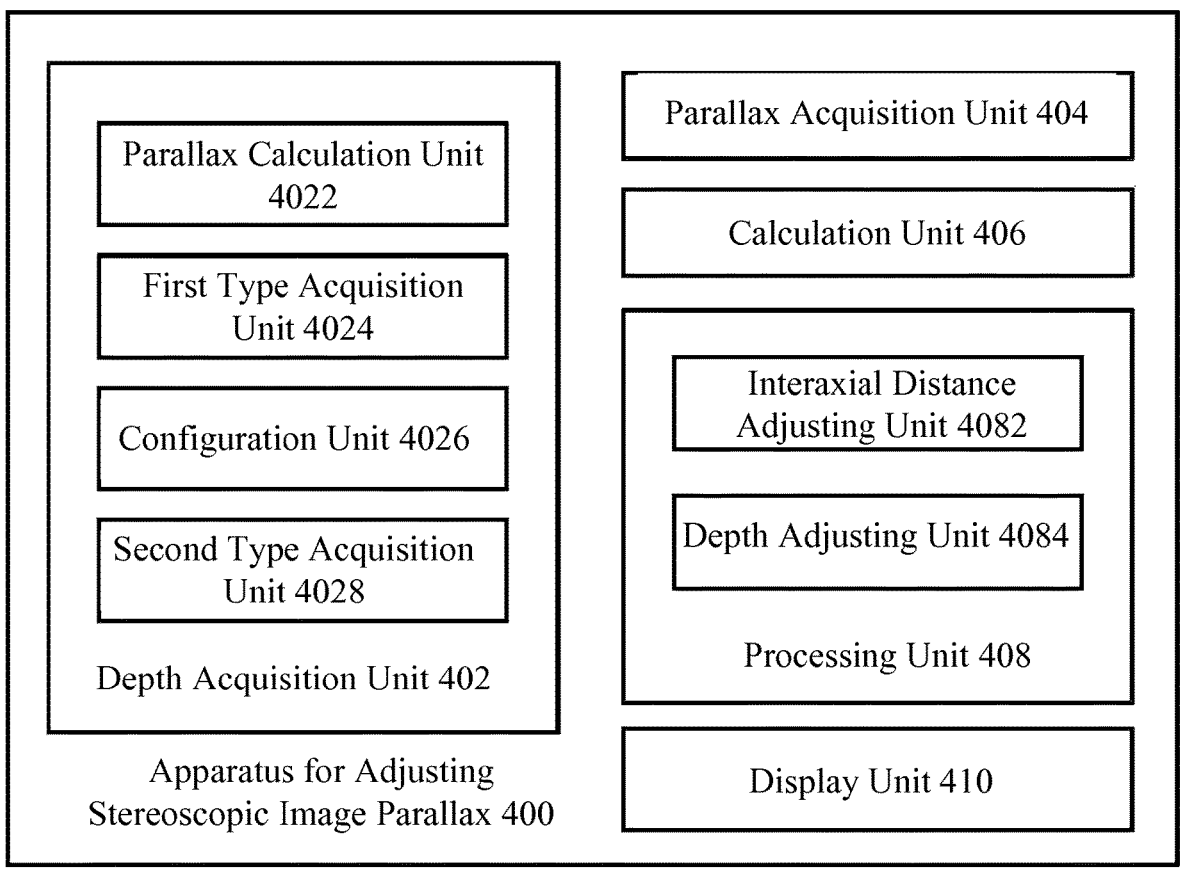
FIG. 4 illustrates a structural diagram of an exemplary apparatus for adjusting stereoscopic image parallax consistent with embodiments of the present disclosure.

FIG. 4 illustrates a structural diagram of an exemplary apparatus for adjusting stereoscopic image parallax consistent with embodiments of the present disclosure.

As shown in FIG. 4, the exemplary parallax adjusting apparatus 400 may be used in a stereo camera and may include a depth acquisition unit 402, a parallax acquisition unit 404, a calculation unit 406 and a processing unit 408. Other units may also be included.

The depth acquisition unit 402 may be configured to obtain a depth range of a current scene. The parallax acquisition unit 404 may be configured to obtain a preset parallax range according to a current viewing condition. The calculation unit 406 may be configured to calculate expected camera parameters of the current scene according to the depth range of the current scene and the preset parallax range. The processing unit 408 may be configured to adjust the stereo camera according to the expected camera parameters, and after capturing preprocessed stereoscopic images using the adjusted stereo camera, process the preprocessed stereoscopic images according to the expected camera parameters to make the preprocessed stereoscopic images suitable for being viewed under the current viewing condition.

Thus, in operation, the above exemplary parallax adjusting apparatus 400 may first obtain a depth range of a current scene. A preset parallax range according to a current viewing condition may also be obtained. The depth range of the current scene and the preset parallax range may be used to determine expected camera parameters.

The stereo camera may adjust interaxial distance or interocular distance of the stereo camera to an expected interaxial distance. Further, the adjusted stereo camera may capture preprocessed stereoscopic images according to the expected interaxial distance. Further, the preprocessed stereoscopic images captured using the expected interaxial distance may be processed such that the preprocessed stereoscopic images satisfies the preset parallax range corresponding to the current viewing condition. Thus, the preprocessed stereoscopic images may be suitable for being viewed under the current viewing condition.

In certain embodiments, the expected camera parameters may include an expected distance between an image plane and an optical center of the stereo camera, and an expected interaxial distance, etc. The expected distance between the image plane and the optical center of the stereo camera and the expected interaxial distance may satisfy equation $$d_1 D_1 < f \times B \leq \frac{(d_1 - d_2) \times D_1 \times D_2}{D_2 - D_1},$$

where f denotes the expected distance between the image plane and the optical center of the stereo camera; B denotes the expected interaxial distance, $[D_1, D_2]$ denotes the depth range of the current scene, and $[d_1, d_2]$ denotes the preset parallax range. Further, $d_1$ refers to maximum positive parallax value under the current viewing condition and satisfies $d_1>0$; and $d_2$ refers to maximum negative parallax value under the current viewing condition and satisfies $d_2<0$.

Further, when designing a stereo camera or adjusting a stereo camera when taking stereoscopic images, proper f and B may be configured according to equation $$d_1 D_1 < f \times B \leq \frac{(d_1 - d_2) \times D_1 \times D_2}{D_2 - D_1}.$$

After such configuration, users may view 3D images or 3D videos captured by the stereo camera with desired display effect.

In one embodiment, the interaxial distance between the two lenses of the stereo camera may be adjustable. The expected camera parameters may include an expected interaxial distance and an expected depth of zero-parallax plane. The processing unit 408 may further include an interaxial distance adjusting unit 4082 and the depth adjusting unit 4084. The interaxial distance adjusting unit 4082 may be configured to adjust the interaxial distance to the expected interaxial distance. The stereo camera may capture preprocessed stereoscopic images after such adjustment. The expected interaxial distance may be denoted as $$B = \frac{d1 - d2}{f\left(\frac{1}{D1} - \frac{1}{D2}\right)}.$$

The depth adjusting unit 4084 may be configured to process the preprocessed stereoscopic images to adjust a depth of zero-parallax plane equal the expected depth of zero-parallax plane. The expected depth of zero-parallax plane may be denoted as $$D_0 = \frac{D_1 D_2 (d_1 - d_2)}{D_1 d_1 - D_2 d_2},$$

where f denotes the distance between the image plane and the optical center of the stereo camera, $[D_1, D_2]$ denotes the depth range of the current scene, and $[d_1, d_2]$ denotes the preset parallax range.

When the interaxial distance is adjustable, the expected camera parameters may include the expected interaxial distance and the expected depth of zero-parallax plane. The interaxial distance of the stereo camera may be controlled and automatically adjusted to equal the expected interaxial distance. That is, the parameters of the stereo camera may be configured. When the interaxial distance of the stereo camera equals the expected interaxial distance, the stereo camera may capture the preprocessed stereoscopic images. Because the optical axes of a left lens and a right lens in the stereo camera are parallel, the captured preprocessed stereoscopic images may not have zero-parallax plane. That is, there is no image disparity between a preprocessed stereo image pair. Therefore, further processing of the captured preprocessed stereoscopic images is required to produce the zero-parallax plane and ensure the depth of the zero-parallax plane equals the expected depth of zero-parallax plane. Thus, the parallax range of the captured preprocessed stereoscopic images after such processing may equal the preset parallax range.

In one embodiment, the depth adjusting unit 4084 may be further configured to horizontally shift a left image of the preprocessed stereoscopic images to the left for a predetermined distance, and horizontally shift a right image of the preprocessed stereoscopic images to the right for the predetermined distance. After the horizontal shifting process, the depth of the zero-parallax plane of the stereo image pair may equal the expected depth of zero-parallax plane. The predetermined distance may be denoted as $$h = \frac{D_2 d_2 - D_1 d_1}{2 \times (D_1 - D_2)},$$

where $[D_1, D_2]$ denotes the depth range of the current scene, and $[d_1, d_2]$ denotes the preset parallax range.

In the disclosed parallax adjusting apparatus 400, since the optical axes of the left lens and the right lens in the stereo camera are parallel, a captured preprocessed stereo image pair does not have zero-parallax plane. The preprocessed stereo image pair may be horizontally shifted on a horizontal direction. Specifically, a left image may be moved to the left for a predetermined distance, which is equivalent to horizontally shift the image plane of the left lens to the right. Similarly, the right image may be moved to the right for a predetermined distance, which is equivalent to horizontally shift the image plane of the right lens to the left. After performing the horizontal shifting process, a line connecting the optical center and the image plane center of the left lens and a line connecting the optical center and the image plane center of the right lens may converge and intersect at one point. A plane crossing the point of intersection and parallel to the image plane is the zero-parallax plane. The vertical distance between the point of intersection and the stereo camera is the depth of the zero-parallax plane. The predetermined distance for moving the lenses may be adjusted such that the depth of the zero-parallax plane equals the expected depth of zero-parallax plane. Therefore, the parallax range of the processed stereo image pair may equal the preset parallax range.

In one embodiment, the interaxial distance of the stereo camera may be fixed. The expected camera parameters may include an expected depth of zero-parallax plane. The expected depth of zero-parallax plane may satisfy equation $$\frac{D_2 \times f \times B}{f \times B - d_2 \times D_2} \le D_0 \le \frac{D_1 \times f \times B}{f \times B - d_1 \times D_1},$$

where $D_0$ denotes the expected depth of zero-parallax plane, f denotes a distance between the image plane and the optical center of the stereo camera, B denotes the interaxial distance, $[D_1, D_2]$ denotes the depth range of the current scene, and $[d_1, d_2]$ denotes the preset parallax range.

When the interaxial distance is fixed, the expected camera parameters may include an expected depth range of zero-parallax plane. After the stereo camera adjusts the expected camera parameters to satisfy equation $$\frac{D_2 \times f \times B}{f \times B - d_2 \times D_2} \le D_0 \le \frac{D_1 \times f \times B}{f \times B - d_1 \times D_1},$$

preprocessed stereoscopic images captured by the stereo camera may be further processed to ensure against undesirable display effect.

In one embodiment, the depth acquisition unit 402 may further include a parallax calculation unit 4022 and a first type acquisition unit 4024. The stereo camera may capture an initial stereo image pair of the current scene. The parallax calculation unit 4022 may be configured to calculate a parallax between an initial stereo image pair. The first type acquisition unit 4024 may be configured to obtain the depth range of the current scene according to a calibration result of the stereo camera and the parallax between the initial pair of stereoscopic images.

Further, as the depth range may be obtained by processing the initial stereo image pair, the process of obtaining the depth range may be fully automatic. According to the parallax between a left image and a right image of the initial stereo image pair, combining current parameter f of the stereo camera obtained from calibration, the depth information of the shooting scene may be restored. The current parameter f of the stereo camera obtained from calibration refers to a distance between an optical center and an image plane (refer to equations (5) and (6) for detailed description) of the lenses in the stereo camera. It is understood that, in one example, the depth range may refer to a range between a closest point and a farthest point of a current scene. In another example, the depth range may refer to a range between a closest point and a farthest point of a certain subject in a current scene. The subject may be selected according to practical filming needs.

After obtaining the depth range of the current scene, the exemplary apparatus may further obtain a preset parallax range according to a current viewing condition, and determine expected camera parameters according to the depth range of the current scene, current parameters of the stereo camera and the preset parallax range. The stereo camera may adjust an interaxial distance to equal an expected interaxial distance, capture preprocessed stereoscopic images with the expected interaxial distance, and process the captured preprocessed stereoscopic images. The preprocessed stereoscopic images may then satisfy the preset parallax range corresponding to the current viewing condition, therefore the preprocessed stereoscopic images may be suitable be suitable for being viewed under the current viewing condition.

In another embodiment, the depth acquisition unit 402 may further include a configuration unit 4026 and a second type acquisition unit 4028. The configuration unit 4026 may be configured to set a preset depth range according to a received command. The second type acquisition unit 4028 may be configured to obtain the preset depth range, and configure the depth range of the current scene to equal the preset depth range.

Further, the depth range of the current scene may be pre-stored in the stereo camera. When capturing stereoscopic images, the stereo camera may directly apply the pre-stored depth range. In addition, a user may voluntarily configure a proper depth range according to a current scene.

It is understood that, obtaining a depth range of a current scene may not limited to the two embodiments described above. For example, a user may assign a particular area in the current scene (as a subject), and by calculating the depth range of the assigned area, the depth range $[D_1, D_2]$ may be obtained semi-automatically.

In certain embodiments, the parallax acquisition unit 404 may further be configured to: according to parameters of a stereoscopic display device and desired viewing parameters corresponding to the stereoscopic display device, calculate a maximum positive parallax value and a maximum negative parallax value under the current viewing condition.

Viewing conditions may vary according to different stereoscopic display devices with various display screen size and different viewing parameters such as viewing distance. The parallax ranges for desirably viewing 3D images under different viewing conditions may also be different. However, under each specified viewing condition, an optimal parallax range limit may exist, so that the captured 3D images are within such parallax range limit and generally do not cause undesired display effect. That is, the parallax range limit refers to a maximum parallax range of the 3D images when ensuring a desired viewing experience.

When using the parallax range limit to determine expected camera parameters of the stereo camera, after processing according to the expected camera parameters, the preprocessed stereoscopic images may not only be desired for viewing, but also have maximized parallax range. Comparing to the existing technologies which sets object distance and parallax of key points, using the parallax range limit as the preset parallax range may guarantee a desired viewing experience of the stereo images.

The preset parallax range may be affected by viewing conditions. Therefore, the parallax acquisition unit 404 may pre-store a plurality of preset parallax ranges, together with a plurality of viewing modes corresponding to the plurality of preset parallax ranges. The viewing modes may include a theater mode, a TV mode, a computer mode, a mobile phone mode, a tablet mode, etc. When using the stereo camera to capture stereoscopic images, a user may choose a desired viewing mode so that the preset parallax range may adjust automatically to maximize the parallax range of captured stereoscopic images under desirable viewing condition.

In certain embodiments, the processing unit 408 may be further configured to: adjust at least one of a distance between the optical centers and the image planes of the stereo camera and an interaxial distance according the expected camera parameters. After such adjustment, the stereo camera may capture preprocessed stereoscopic images. The processing unit 408 may further include a depth adjusting unit 4084. According to the expected camera parameters, the depth adjusting unit 4084 may be configured to process the captured preprocessed stereoscopic images by horizontally shifting a left image and a right image of the preprocessed stereoscopic images in opposite directions.

As the optical axes of the left lens and the right lens in the stereo camera are parallel, the captured preprocessed stereoscopic images do not have zero-parallax plane. Therefore, after processing the preprocessed stereoscopic images by horizontally shifting, the depth of the zero-parallax plane of the preprocessed stereoscopic images may equal the expected depth of zero-parallax plane, and the parallax range of the preprocessed stereoscopic images may equal the preset parallax range.

In certain embodiments, the disclosed parallax adjusting apparatus may further include a display unit 410 (not shown in FIG. 4). The display unit 410 may be a stereoscopic display. The stereoscopic display may be provided on the stereo camera. The display unit 410 may be configured to satisfy a preset horizontal resolution requirement and display captured preprocessed stereoscopic images and/or captured initial stereo image pair in real-time. The preset horizontal resolution requirement is $$R' \geq \max\left(\frac{d_{1(p)}}{d'_{1(m)}}, \frac{d_{2(p)}}{d'_{2(m)}}\right) \times W',$$

where R' denotes the preset horizontal resolution, $[d_{1(p)}, d_{2(p)}]$ denotes the preset parallax range in pixels, p denotes pixel, $[d'_{1(m)}, d'_{2(m)}]$ denotes the parallax range of the stereoscopic display in meters, m denotes meters, W' denotes the width of the stereoscopic display, max denotes a function to obtain a maximum value.

The exemplary apparatus may install a stereoscopic display on the stereo camera as the display unit 410. While capturing images, the display unit 410 may display in real-time the captured initial stereo image pair and/or the preprocessed stereoscopic images. However, since the parallax range of the stereo image pair equals the preset parallax range of a specified viewing condition, a stereoscopic display in the specified viewing condition may have different size than the stereoscopic display of the stereo camera. Users may have undesired experience when viewing the captured images on the stereoscopic display of the stereo camera. Therefore, in order to provide a desired viewing experience, the resolution of the stereoscopic display of the stereo camera should satisfy the preset horizontal resolution requirement to prevent the photographers from undesired viewing experience during a filming process.

The present disclosure also provides an exemplary stereo camera (not shown in figures). The exemplary stereo camera may include the exemplary parallax adjusting apparatus 400 in various embodiments described above.

The exemplary stereo camera may integrate the exemplary parallax adjusting apparatus 400. Parameters of the exemplary stereo camera and stereo images captured by the exemplary stereo camera may be jointly adjusted. Therefore, users may view stereo images or videos with a maximized parallax and desired display effect under a specified viewing condition. The present disclosure may keep a stunning 3D effect in stereo images or videos and avoid undesired viewing experience brought by the existing technologies, such as dizziness, eye fatigue and other symptoms.

Figure 5:
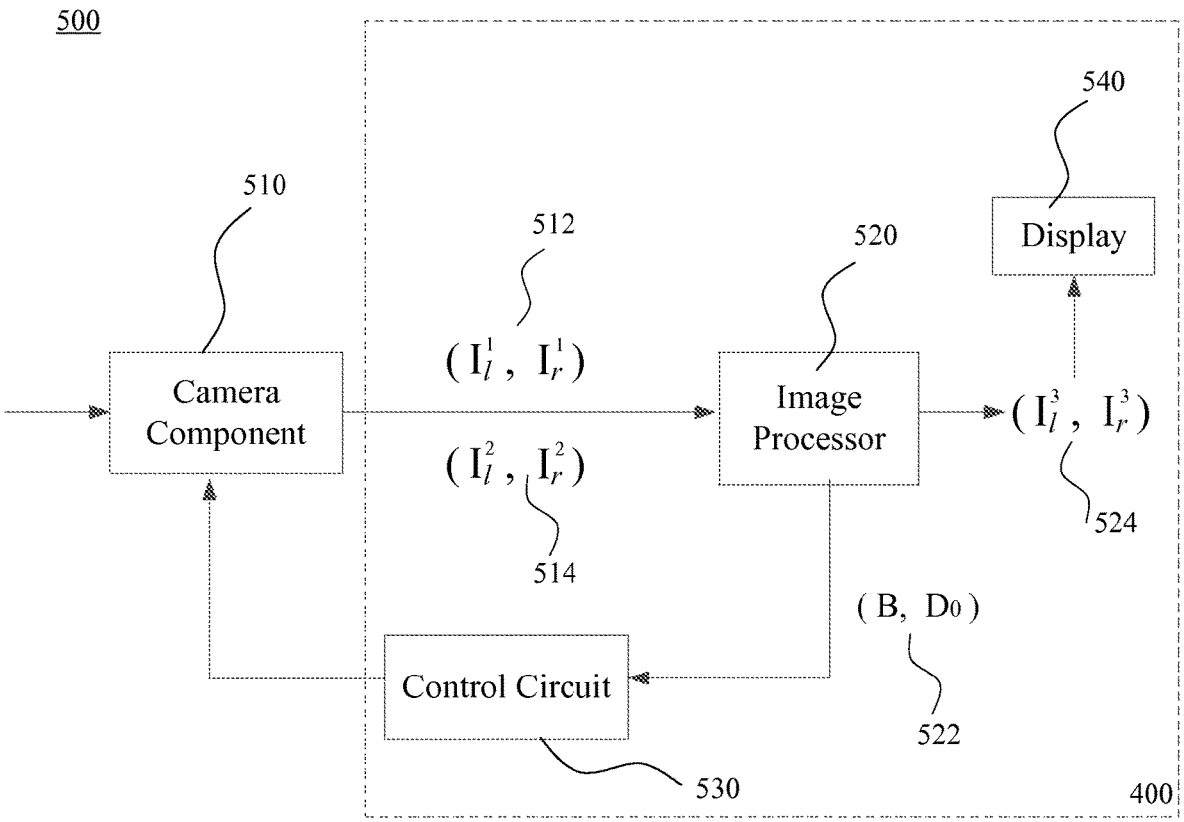
FIG. 5 illustrates a block diagram of an exemplary stereo camera consistent with embodiments of the present disclosure.

FIG. 5 is a block diagram illustrating an exemplary stereo camera consistent with various embodiments of the present disclosure.

As shown in FIG. 5, the exemplary stereo camera 500 may include a camera component 510, an image processor 520 and a control circuit 530. The camera component 510 may include a left camera and a right camera configured to capture stereo images or stereo videos. A left lens of the left camera and a right lens of the right camera may have parallel optical axes. The image processor 520 may be configured to process captured stereo images or stereo videos, calculate expected camera parameters and output processed stereo images or videos. The control unit 530 may be configured to adjust parameters of the camera component 510 according to the expected camera parameters provided by the image processor 520. In certain embodiments, the image processor 520 and the control circuit 530 may be provided by the parallax adjusting apparatus 400.

In an exemplary embodiment, the interaxial distance of the stereo camera may be adjustable. When operating, the camera component 510 may capture an initial stereo image pair $(I_l^1, I_r^1)$ of a current scene, where $I_l^1$ denotes an initial left image taken by the left camera and $I_r^1$ denotes an initial right image taken by the right camera. The camera component 510 may send the initial stereo image pair $(I_l^1, I_r^1)$ to the image processor 520 for further processing.

When receiving the initial stereo image pair $(I_l^1, I_r^1)$, the image processor 520 may calculate an initial parallax between the initial left image and the initial right image. According to the initial parallax and current parameters of the camera component 510 (e.g. current focal length and current interaxial distance), the image processor 520 may restore a depth range of the current scene. Further, the image processor 520 may calculate an optimal set of parameters (B, $D_0$) according to the depth range of the current scene, a specified viewing condition and parameters of the camera component 510 (e.g. a distance between the optical center and the image plane of the camera component), where B denotes an expected interaxial distance and $D_0$ denotes an expected depth of zero-parallax plane (i.e. a distance between the zero-parallax plane and the lenses).

The control circuit 530 may receive the expected interaxial distance B in real-time from the image processor 520 and control the camera component 510 to adjust the interaxial distance to equal B. The camera component 510 may automatically adjust the interaxial distance and retake a stereo image pair $(I_l^2, I_r^2)$ of the current scene, where $I_l^2$ denotes a retaken left image captured by the left camera and $I_r^2$ denotes a retaken right image captured by the right camera. The camera component 510 may send the stereo image pair $(I_l^2, I_r^2)$ to the image processor 520 for further processing.

When receiving the stereo image pair $(I_l^2, I_r^2)$ retaken by the camera component 510 after adjustment, the image processor 520 may process the stereo image pair according to the interaxial distance B and the expected depth of zero-parallax plane $D_0$ to produce a processed stereo image pair $(I_l^3, I_r^3)$. The processed stereo image pair $(I_l^3, I_r^3)$ may be directly inputted to a 3D display device for viewing. The processed stereo image pair $(I_l^3, I_r^3)$ may present a strong stereoscopic effect under the premise that processed stereo image pair are suitable for being viewed.

Further, a parallax range limit $[d_1, d_2]$ may exist under the specified viewing condition, where $d_1$ refers to an allowed maximum positive parallax value and satisfies $d_1 > 0$; and $d_2$ refers to an allowed maximum negative parallax value and satisfies $d_2 < 0$. Stereo images or videos within the parallax range limit $[d_1, d_2]$ generally may not cause undesired viewing experience under the specified viewing condition. The parallax range limit $[d_1, d_2]$ may be used as a preset parallax range for the image processor 520 to calculate parameters (B, $D_0$).

Moreover, when the image processor 520 calculates the optimal set of parameters (B, $D_0$) according to the depth range of the current scene, the specified viewing condition and parameters of the camera component 510, (B, $D_0$) may satisfy equations B=

$$\frac{d_1 - d_2}{f\left(\frac{1}{D_1} - \frac{1}{D_2}\right)} \text{ and } D_0 = \frac{D_1 D_2 (d_1 - d_2)}{D_1 d_1 - D_2 d_2},$$

where f denotes the distance between the image plane and the optical center of the stereo camera, $[D_1, D_2]$ denotes the depth range of the current scene, and $[d_1, d_2]$ denotes the preset parallax range according to the specified viewing condition.

It should be noted that in this embodiment, $[D_1, D_2]$ denotes the depth range of the current scene and is obtained by processing the initial stereo image pair $(I_l^1, I_r^1)$. In other embodiments, $[D_1, D_2]$ may be a depth range of a subject in the current scene. The subject may be assigned by a user or calculated by image processing techniques. Further, in some embodiments, capturing and processing the initial stereo image pair may be omitted. $[D_1, D_2]$ may be pre-stored in the stereo camera or set by user commands.

After obtaining (B, $D_0$), the control circuit 530 may adjust the interaxial distance of camera component 510 to equal B. The camera component 510 may then capture a stereo image pair $(I_l^2, I_r^2)$.

When processing the stereo image pair $(I_l^2, I_r^2)$ to produce $(I_l^3, I_r^3)$, the image processor 520 may horizontally shift the left image $I_l^2$ to the left for a predetermined distance and horizontally shift the right image $I_r^2$ to the right for the predetermined distance. The predetermined distance may be $$h = \frac{D_2 d_2 - D_1 d_1}{2 \times (D_1 - D_2)}.$$

The parallax range of the processed stereo image pair $(I_l^3, I_r^3)$ may equal the preset parallax range to provide a desirable viewing experience under the specified viewing condition.

In certain embodiments, the exemplary stereo camera 500 may further include a display 540. The display 540 may be a stereoscopic display to allow users to view processed stereo images or videos in real-time. However, the processed stereo image pair $(I_l^3, I_r^3)$ is obtained to accommodate the specified viewing condition with the preset parallax range $[d_1, d_2]$. The viewing condition of the display 540 may be different and may have a parallax range $[d'_1, d'_2]$. The display 540 may fulfill a preset horizontal resolution requirement to ensure a desired display effect for the users. The preset horizontal resolution requirement may be $$R' \geq \max\left(\frac{d_{1(p)}}{d'_{1(m)}}, \frac{d_{2(p)}}{d'_{2(m)}}\right) \times W',$$

where R' denotes the preset horizontal resolution, $[d_{1(p)}, d_{2(p)}]$ denotes the preset parallax range in pixels, p denotes pixel, $[d'_{1(m)}, d'_{2(m)}]$ denotes the parallax range of the stereoscopic display in meters, m denotes meters, W' denotes the width of the stereoscopic display, max denotes a function to obtain a maximum value.

In various embodiments, the disclosed parallax adjusting apparatus 400 may be implemented by hardware, software or a combination of hardware and software. Similarly, various components of the exemplary stereo camera 500 (e.g. image processor 520) may be implemented by hardware, software or a combination of hardware and software.

Figure 6:
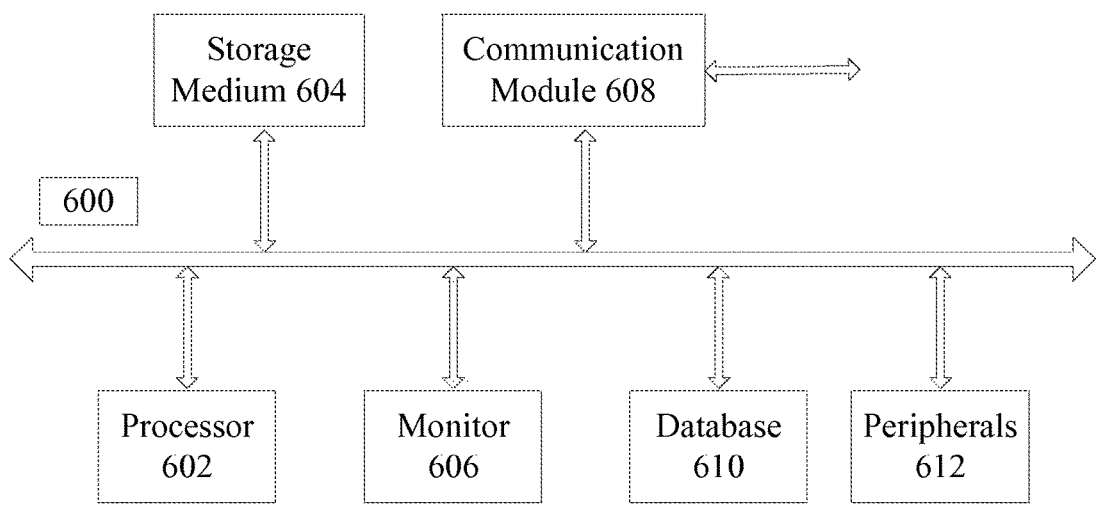
FIG. 6 illustrates a structural diagram of an exemplary environment incorporating various embodiments of the present disclosure.

In various embodiments, an exemplary apparatus for adjusting stereoscopic image parallax and/or components of an exemplary stereo camera may be implemented on any appropriate computing platform. FIG. 6 shows a block diagram of an exemplary computing system 600 capable of implementing the exemplary apparatus and/or the exemplary stereo camera. The computing system 600 may include a processor 602, a storage medium 604, a monitor 606, a communication module 608, a database 610, and peripherals 612. Certain devices may be omitted and other devices may be included.

Processor 602 may include any appropriate processor or processors. Further, processor 602 can include multiple cores for multi-thread or parallel processing. Storage medium 604 may include memory modules, such as ROM, RAM, and flash memory modules, and mass storages, such as CD-ROM, U-disk, hard disk, etc. Storage medium 604 may store computer programs for implementing various processes, when executed by processor 602.

Further, monitor 606 may present various types of information to a user, such as user interface, menu options, images, videos, etc. Monitor 606 may be a stereoscopic display. Peripherals 612 may include I/O devices such as keyboard, mouse, touch screen, keys on a digital camera, etc. Communication module 608 may include network devices for establishing connections through a wireless or wired communication network. Database 610 may include one or more databases for storing certain data and for performing certain operations on the stored data, such as database searching.

In various embodiments, the disclosed modules for the exemplary system as depicted above can be configured in one device or configured in multiple devices as desired. The modules disclosed herein can be integrated in one module or in multiple modules for processing messages. Each of the modules disclosed herein can be divided into one or more sub-modules, which can be recombined in any manners.

The disclosed embodiments are examples only. One of ordinary skill in the art would appreciate that suitable software and/or hardware (e.g., a universal hardware platform) may be included and used to perform the disclosed methods. For example, the disclosed embodiments can be implemented by hardware only, which alternatively may be implemented by software only or a combination of hardware and software. The software can be stored in a storage medium. The software can include suitable commands to enable any client device (e.g., including a digital camera, a smart terminal, a server, or a network device, etc.) to implement the disclosed embodiments.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for adjusting stereoscopic image parallax in a stereo camera having at least two lenses with parallel optical axes, comprising:
   obtaining a depth range of a current scene;
   obtaining a preset parallax range according to a current viewing condition;
   calculating expected camera parameters of the current scene according to the depth range of the current scene and the preset parallax range;
   adjusting the stereo camera according to the expected camera parameters;
   capturing preprocessed stereoscopic images using the adjusted stereo camera; and
   processing the preprocessed stereoscopic images according to the expected camera parameters to make the preprocessed stereoscopic images suitable for being viewed under the current viewing condition,
   wherein the expected camera parameters of the current scene include an expected distance between an image plane and an optical center of the stereo camera and an expected interaxial distance of the stereo camera, and
   the expected distance between the image plane and the optical center of the stereo camera and the expected interaxial distance satisfy equation $$d_1 D_1 < f \times B \leq \frac{(d_1 - d_2) \times D_1 \times D_2}{D_2 - D_1},$$

wherein f denotes the expected distance between the image plane and the optical center of the stereo camera, B denotes the expected interaxial distance, $[D_1, D_2]$ denotes the depth range of the current scene, $[d_1, d_2]$ denotes the preset parallax range, $d_1$ refers to a maximum positive parallax value under the current viewing condition and satisfies $d_1 > 0$, and $d_2$ refers to a maximum negative parallax value under the current viewing condition and satisfies $d_2 < 0$.

2. The method according to claim 1, obtaining a depth range of a current scene further comprising:
   controlling the stereo camera to capture an initial stereo image pair of the current scene;
   calculating a parallax between the initial stereo image pair; and
   calculating the depth range of the current scene according to the parallax between the initial stereo image pair and current parameters of the stereo camera.

3. The method according to claim 1, obtaining a depth range of a current scene further comprising:
   setting a preset depth range according to a received command;
   obtaining the preset depth range; and
   making the depth range of the current scene equal to the preset depth range.

4. The method according to claim 1, wherein:

adjusting the stereo camera according to the expected camera parameters further includes adjusting at least one of an expected distance between an image plane and an optical center of the stereo camera and an expected interaxial distance of the stereo camera;

processing the preprocessed stereoscopic images further includes horizontally shifting a left image and a right image of the preprocessed stereoscopic images in opposite directions.

5. The method according to claim 1, obtaining a preset parallax range according to a current viewing condition further comprising:
   obtaining a size of a stereoscopic display of the current viewing condition;
   obtaining a desired viewing distance corresponding to the stereoscopic display; and
   calculating the maximum positive parallax value and the maximum negative parallax value according to the current viewing condition.

6. The method according to claim 1, wherein:
   when an interaxial distance between a left lens and a right lens of the stereo camera is adjustable, the expected camera parameters include an expected interaxial distance and an expected depth of zero-parallax plane;
   adjusting the stereo camera further includes adjusting the interaxial distance of the stereo camera to equal the expected interaxial distance $$B = \frac{d_1 - d_2}{f\left(\frac{1}{D_1} - \frac{1}{D_2}\right)},$$

wherein B denotes the expected interaxial distance, f denotes a distance between an image plane and an optical center of the stereo camera; and
processing the preprocessed stereoscopic images further includes processing the preprocessed stereoscopic images such that depth of zero-parallax plane of the preprocessed stereoscopic images equals the expected depth of zero-parallax plane $$D_0 = \frac{D_1 D_2 (d_1 - d_2)}{D_1 d_1 - D_2 d_2},$$

wherein $D_0$ denotes the expected depth of zero-parallax plane, $[D_1, D_2]$ denotes the depth range of the current scene, $[d_1, d_2]$ denotes the preset parallax range, $d_1$ refers to a maximum positive parallax value under the current viewing condition and satisfies $d_1 > 0$, and $d_2$ refers to a maximum negative parallax value under the current viewing condition and satisfies $d_2 < 0$.

7. The method according to claim 6, processing the preprocessed stereoscopic images further includes:
   horizontally shifting the left image of the preprocessed stereoscopic images to the left for a predetermined distance h;
   horizontally shifting the right image of the preprocessed stereoscopic images to the right for the predetermined distance h; and
   the predetermined distance is $$h = \frac{(D_2 d_2 - D_1 d_1)}{2(D_1 - D_2)}.$$

8. The method according to claim 1, wherein:
   when an interaxial distance between a left lens and a right lens of the stereo camera is fixed, the expected camera parameters include an expected depth of zero-parallax plane; and
   the expected depth of zero-parallax plane satisfies equation $$\frac{D_2 \times f \times B}{f \times B - d_2 \times D_2} \le D_0 \le \frac{D_1 \times f \times B}{f \times B - d_1 \times D_1},$$

wherein $D_0$ denotes the expected depth of zero-parallax plane, f denotes a distance between the image plane and the optical center of the stereo camera, B denotes the interaxial distance, $[D_1, D_2]$ denotes the depth range of the current scene, and $[d_1, d_2]$ denotes the preset parallax range.

9. The method according to claim 1, further comprising:
   displaying at least one of initial stereoscopic images and the preprocessed stereoscopic images in real-time on a stereoscopic display of the stereo camera,
   wherein the stereoscopic display satisfies a preset horizontal resolution requirement $$R' \ge \max\left(\frac{d_{1(p)}}{d'_{1(m)}}, \frac{d_{2(p)}}{d'_{2(m)}}\right) \times W',$$

wherein R' denotes the preset horizontal resolution, $[d_{1(p)}, d_{2(p)}]$ denotes the preset parallax range in pixels, p denotes pixel, $[d'_{1(m)}, d'_{2(m)}]$ denotes the parallax range of the stereoscopic display in meters, m denotes meters, W' denotes a width of the stereoscopic display, and max denotes a function to obtain a maximum value.

10. An apparatus for adjusting stereoscopic image parallax in a stereo camera having at least two lenses with parallel optical axes, comprising:
   a memory storing instructions; and
   a processor coupled to the memory and, when executing the instructions, configured to:
   obtain a depth range of a current scene;
   obtain a preset parallax range according to a current viewing condition;
   calculate expected camera parameters of the current scene according to the depth range of the current scene and the preset parallax range; and
   adjust the stereo camera according to the expected camera parameters and, after capturing preprocessed stereoscopic images using the adjusted stereo camera, to process the preprocessed stereoscopic images according to the expected camera parameters to make the preprocessed stereoscopic images suitable for being viewed under the current viewing condition,
   wherein the expected camera parameters of the current scene include an expected distance between an image plane and an optical center of the stereo camera and an expected interaxial distance of the stereo camera, and
   the expected distance between the image plane and the optical center of the stereo camera and the expected interaxial distance satisfy equation $$d_1 D_1 < f \times B \le \frac{(d_1 - d_2) \times D_1 \times D_2}{D_2 - D_1},$$

wherein f denotes the expected distance between the image plane and the optical center of the stereo camera, B denotes the expected interaxial distance, $[D_1, D_2]$ denotes the depth range of the current scene, $[d_1, d_2]$ denotes the preset parallax range, $d_1$ refers to a maximum positive parallax value under the current viewing condition and satisfies $d_1>0$, and $d_2$ refers to a maximum negative parallax value under the current viewing condition and satisfies $d_2<0$.

11. The apparatus according to claim 10, wherein the processor is further configured to:
  calculate a parallax between an initial stereo image pair when the stereo camera captures the initial stereo image pair of the current scene; and
  obtain the depth range of the current scene according to the parallax between the initial stereo image pair and current parameters of the stereo camera.

12. The apparatus according to claim 10, wherein the processor is further configured to:
  set a preset depth range according to a received command; and
  obtain the preset depth range, and configure the depth range of the current scene to equal the preset depth range.

13. The apparatus according to claim 10, wherein the processor is further configured to:
  adjust at least one of an expected distance between an image plane and an optical center of the stereo camera and an expected interaxial distance of the stereo camera according to the expected camera parameters; and
  after capturing preprocessed stereoscopic images using the adjusted stereo camera, horizontally shift a left image and a right image of the preprocessed stereoscopic images in opposite directions.

14. The apparatus according to claim 10, wherein the processor is further configured to:
  obtain a size of a stereoscopic display of the current viewing condition;
  obtain a desired viewing distance corresponding to the stereoscopic display; and
  calculate the maximum positive parallax value and the maximum negative parallax value according to the current viewing condition.

15. The apparatus according to claim 10, wherein:
  when an interaxial distance of the stereo camera is adjustable, the expected camera parameters include an expected interaxial distance and an expected depth of zero-parallax plane;
  the processor is further configured to:
  adjust the interaxial distance of the stereo camera to equal the expected interaxial distance $$B = \frac{d_1 - d_2}{f\left(\frac{1}{D_1} - \frac{1}{D_2}\right)},$$

wherein B denotes the expected interaxial distance, f denotes a distance between an image plane and an optical center of the stereo camera; and
  process the preprocessed stereoscopic images such that depth of zero-parallax plane of the processed preprocessed stereoscopic images equals the expected depth of zero-parallax plane $$D_0 = \frac{D_1 D_2 (d_1 - d_2)}{D_1 d_1 - D_2 d_2},$$

wherein $D_0$ denotes the expected depth of zero-parallax plane, $[D_1, D_2]$ denotes the depth range of the current scene, $[d_1, d_2]$ denotes the preset parallax range, $d_1$ refers to a maximum positive parallax value under the current viewing condition and satisfies $d_1>0$, and $d_2$ refers to a maximum negative parallax value under the current viewing condition and satisfies $d_2<0$.

16. The apparatus according to claim 15, wherein the processor is further configured to:
  horizontally shift a left image of the preprocessed stereoscopic images to the left for a predetermined distance h;
  horizontally shift a right image of the preprocessed stereoscopic images to the right for the predetermined distance h; and
  the predetermined distance is $$h = \frac{(D_2 d_2 - D_1 d_1)}{2(D_1 - D_2)}.$$

17. The apparatus according to claim 10, wherein:
  when an interaxial distance between a left lens and a right lens of the stereo camera is fixed, the expected camera parameters include an expected depth of zero-parallax plane; and
  the expected depth of zero-parallax plane satisfies equation $$\frac{D_2 \times f \times B}{f \times B - d_2 \times D_2} \leq D_0 \leq \frac{D_1 \times f \times B}{f \times B - d_1 \times D_1},$$

wherein $D_0$ denotes the expected depth of zero-parallax plane, f denotes a distance between the image plane and the optical center of the stereo camera, B denotes the interaxial distance, $[D_1, D_2]$ denotes the depth range of the current scene, and $[d_1, d_2]$ denotes the preset parallax range.

18. The apparatus according to claim 10, further comprising:
  a stereoscopic display configured to display a stereo image pair in real-time on the stereo camera,
  wherein the stereoscopic display satisfies a preset horizontal resolution requirement $$R' \geq \max\left(\frac{d_{1(p)}}{d'_{1(m)}}, \frac{d_{2(p)}}{d'_{2(m)}}\right) \times W',$$

wherein R' denotes the preset horizontal resolution, $[d_{1(p)}, d_{2(p)}]$ denotes the preset parallax range in pixels, p denotes pixel, $[d'_{1(m)}, d'_{2(m)}]$ denotes the parallax range of the stereoscopic display in meters, m denotes meters, W' denotes a width of the stereoscopic display, and max denotes a function to obtain a maximum value.

* * * * *